(12) United States Patent
Gorshtein et al.

(10) Patent No.: US 12,074,647 B2
(45) Date of Patent: Aug. 27, 2024

(54) SIGNAL RECONSTRUCTION

(71) Applicant: Solanium Labs Ltd., Hod Hasharon (IL)

(72) Inventors: Albert Gorshtein, Hod Hasharon (IL); Or Vidal, Hod Hasharon (IL)

(73) Assignee: SOLANIUM LABS LTD., Hod Hasharon (IL)

( * ) Notice: Subject to any disclaimer, the term of this patent is extended or adjusted under 35 U.S.C. 154(b) by 270 days.

(21) Appl. No.: 17/804,794

(22) Filed: May 31, 2022

(65) Prior Publication Data
US 2023/0027345 A1    Jan. 26, 2023

Related U.S. Application Data

(60) Provisional application No. 63/195,092, filed on May 31, 2021.

(51) Int. Cl.
| | | |
|---|---|---|
| *H04B 10/00* | (2013.01) | |
| *H04B 10/61* | (2013.01) | |
| *H04J 14/00* | (2006.01) | |

(52) U.S. Cl.
CPC ....... *H04B 10/6165* (2013.01); *H04B 10/614* (2013.01)

(58) Field of Classification Search
CPC .... H04B 10/61; H04B 10/612; H04B 10/613; H04B 10/616; H04B 10/6165
See application file for complete search history.

(56) References Cited

U.S. PATENT DOCUMENTS

| | | | | |
|---|---|---|---|---|
| 2015/0043926 | A1* | 2/2015 | Levy | H04B 10/60 398/202 |
| 2015/0071395 | A1* | 3/2015 | Zhou | H04L 27/0014 375/371 |
| 2020/0036440 | A1* | 1/2020 | Yamagishi | H04B 10/61 |

* cited by examiner

*Primary Examiner* — Daniel G Dobson
(74) *Attorney, Agent, or Firm* — Reches Patents

(57) ABSTRACT

A method for signal reconstruction, the method may include obtaining, an input digital signal that is a digital representation of an received optical signal, wherein the received optical signal represents a transmitted optical signal that was transmitted by a coherent transmitter and over a channel to a coherent optical receiver; wherein a phase difference between the transmitted optical signal and the received optical signal is unknown; and generating a hybrid estimation, wherein the hybrid estimation represents a magnitude of the transmitted optical signal and a phase of the received optical signal.

22 Claims, 12 Drawing Sheets

PRIOR ART

Obtaining, an input digital signal that is a digital representation of a received optical signal. The received optical signal represents a transmitted optical signal that was transmitted by a coherent transmitter and over a channel to a coherent optical receiver. The phase difference between the transmitted optical signal and the received optical signal is unknown when the received signal is received. 310

Generating a hybrid estimation. 330

Generating, by an equalizer, an initial estimation of the transmitted optical signal. 331

Processing the initial estimation by a phase maintaining amplitude slicer to provide the hybrid estimation. 332

Responding to the generation of the hybrid estimation. 350

Obtaining an input digital signal that is a digital representation of a received signal that is an optical signal or a radio frequency signal, wherein the received signal represents a transmitted signal that was transmitted by a coherent transmitter and over a channel to a coherent receiver; wherein a phase difference between the transmitted signal and the received signal is unknown. 410

Generating a hybrid estimation. The hybrid estimation represents a magnitude of the transmitted signal and a phase of the received signal 430

Responding to the generation of the hybrid estimation. 450

Obtaining by a coherent receiver a radial representation of a constellation indicative of predefined known values of a transmitted signal; wherein the constellation comprises a plurality of groups of symbols, wherein symbols of a group of symbols share a same radius, wherein different groups of symbols are associated with different radiuses. 510

↓

Obtaining an input digital signal that is a digital representation of a received signal that is an optical signal or a radio frequency signal, wherein the received signal represents a transmitted signal that was transmitted by a coherent transmitter and over a channel to a coherent receiver; wherein a phase difference between the transmitted signal and the received signal is unknown. 530

↓

Determining at least amplitude information regarding an amplitude of the transmitted signal, wherein the determining utilizes the radial representation of the constellation 550

↓

Responding to the determination of step 550. 570

Obtaining, an input digital signal by an adaptive filter of a coherent optical receiver; wherein the input digital signal is a digital representation of an received optical signal, wherein the received optical signal represents a transmitted optical signal that was transmitted by a coherent transmitter and over a channel to the coherent optical receiver; wherein a phase difference between the transmitted optical signal and the received optical signal is unknown. 610

↓

Filtering the input digital signal, by the adaptive filter, to provide a filtered digital signal; wherein the filtering maintains phase information of the received optical signal unchanged. 620

↓

Selecting, based on a magnitude of the filtered digital signal and out of at least one radius values, a selected radius value; wherein each of the at least one radius values represents a group of constellation symbols that share a same radius; wherein the selected radius value is indicative of an amplitude of the transmitted optical signal 630

↓

Providing an estimated signal that exhibits the selected radius and a phase of the received optical signal. 640

↓

Responding to the provision of the estimated signal. 650

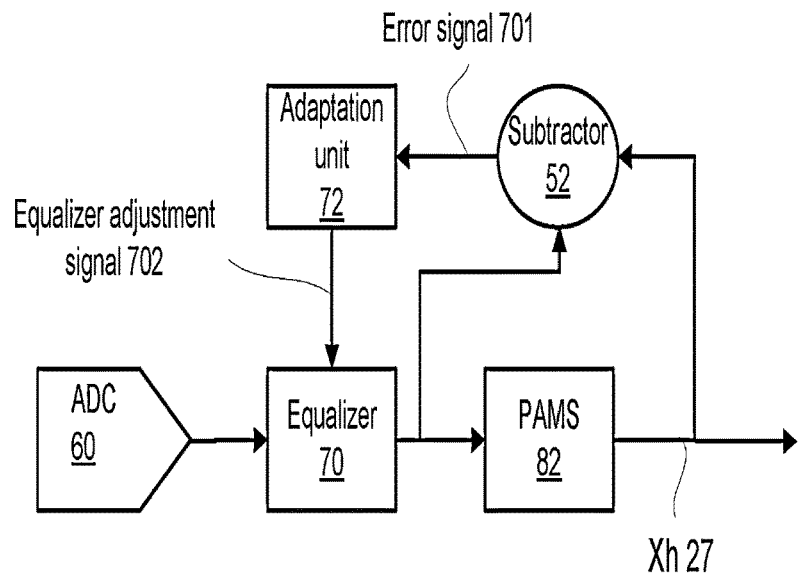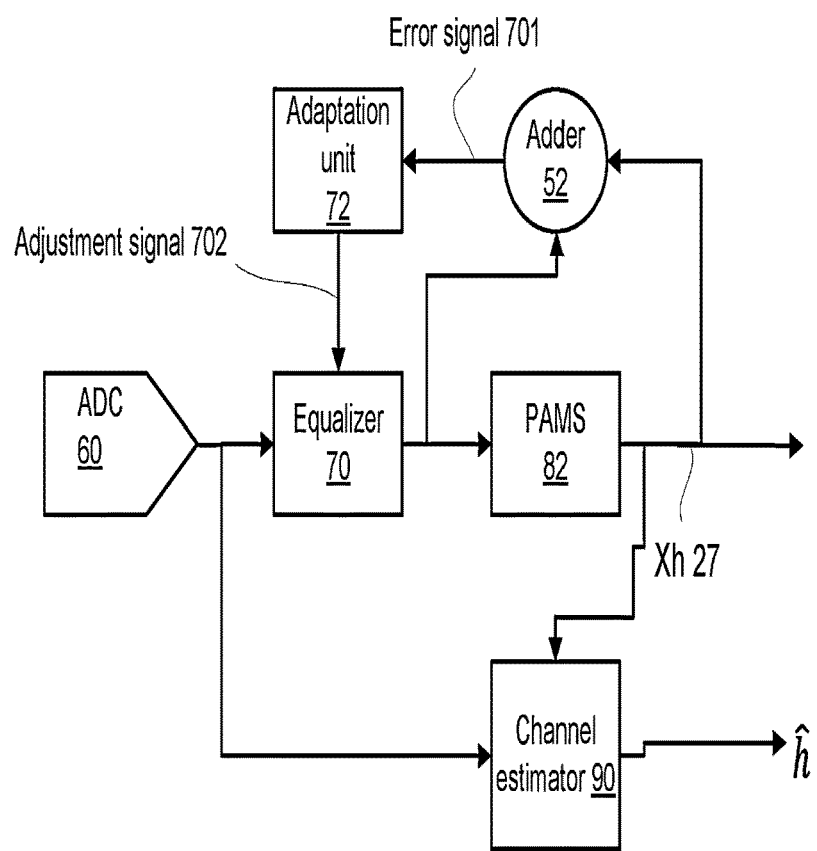
FIG. 11

SIGNAL RECONSTRUCTION

BACKGROUND

A communication system may include a transmitter and a receiver. The receiver may convert a data signal to a transmitted signal. The transmitted signal has to progress over a channel in order to reach the receiver.

The transmitted signal may be modified by the channel to provide the signal that is received by the receiver (hereinafter "received signal").

In order to reconstruct the transmitted signal—thereby allowing to reconstruct the data signal—there is a need to estimate the channel—especially how the channel modifies the transmitted signal.

An example of a channel estimation is a channel impulse response (CIR)—denoted h.

The transmitted signal may undergo a linear convolution operation with the CIR:y=x*h, whereas x represents the transmitted signal, and y represents the received signal.

Some communications schemes—such as non-coherent communication schemes—are indifferent to the phase of the transmitted signal. In this case these communication schemes may assume that the channel only introduces an additive (amplitude) noise w and that the received signal may equal y=x*h+w.

The channel estimation can be calculated based on x and y.

$$\hat{h}=F(y,x)$$

There are several known algorithms for channel estimation—that exhibit different performance and complexity tradeoffs:

Least squares (including many flavors like constrained LS).

Cross correlation that approximates LS with a reduced complexity. Cross correlation may be used when applying the Mueller & Muller algorithm.

MMSE—minimum mean squared error.

The channel estimation may utilize known training sequences or known pilots—when such are transmitted to the receiver.

Blind communication systems do not transmit such known training sequences or known pilots—and the lack of known training sequences or pilots may complicate the channel estimation.

In blind communication systems, the channel estimation is based on estimated transmitted signals: ĥ=F(y, x̂), wherein x̂ is the initial estimation of the transmitted optical signal.

FIG. 1 illustrates a prior art communication system that is constructed under the assumption that only additive noise is introduced.

The system includes a coherent transmitter 30 (that transmits transmitted signal x 11) followed by channel 40 that is followed by a (virtual) adder 50 that adds the additive noise 12 to provide a received signal 15, the received signal is received by the coherent receiver 22.

The coherent receiver 22 is illustrated as including an analog to digital converter (denoted "ADC") 60 that outputs an input digital signal 18 to the equalizer 70 and to the channel estimator 90. The equalizer outputs an equalized signal to the slicer 80. The slicer 80 outputs a slicer output signal that may be an estimation x̂ of the transmitted signal. The input digital signal 18 and the estimation x̂ 19 of the transmitted signal are fed to channel estimator 90. The channel estimator outputs a channel estimation ĥ 20.

FIG. 1 also illustrates constellation 110, the possible values of the input digital signals 120, the possible values of the equalized signals 130, and possible values of the estimated transmitted signals 140 which should equal the constellation 100. The possible values of the input digital signals include overlaps between possible received signal values that are associated with different constellation symbols.

Some communication schemes—such as coherent optical communication systems are also sensitive to phase information. In such systems it also important to determine any phase differences between the transmitted signal and the received signal—in addition to any amplitude information.

A rotating phase disruption associated with the received optical signal may be attributed to at least one of the following:

Common phase (CP)—a fixed phase rotation over all the signals.

Carrier frequency offset (CFO)—a rotating phase caused by frequency differences between a transmitter laser and a receiver laser (if such lasers exist).

Phase noise (PN)—random phase, caused by different noise sources added to the carriers, the noise is concentrated at low frequencies. For example—a laser linewidth, the source of phase noise, is concentrated below several MHz in common low cost lasers. In expensive lasers, it is concentrated below several hundred KHz.

The rotating phase disruption (denoted "PhaseDis") may be taken into account in the following manner:

$$y=(x*h)\cdot\exp(j\cdot(\text{PhaseDis}))+w$$

In order to keep the linear convolution model, the rotating phase disruption can be added to the transmitted signal:

$$y=(x\cdot\exp(j\cdot(\text{PhaseDis})))*h+w=\bar{\bar{x}}*h+w$$

The channel estimation in this case takes x̄ as one of the inputs ĥ=F(y, x̄), wherein x̄ is a virtual transmitted signal that reflects the transmitted signal and any phase difference between the transmitted signal and the received signal.

A prior art method for channel estimation at the presence of a rotating phase disruption may include the following steps (the equalization may precede the phase offset estimation and correction or may follow the phase offset estimation and correction):

Equalization.

Phase offset estimation and correction.

Estimation of Tx symbols x̂.

Applying the estimated phase over x̂ to estimate x̄=x̂·exp(j·($\widehat{Phase}$ )).

FIG. 2 illustrates a prior art system at the presence of a phase difference between the transmitted signal and the received signal.

The system includes a coherent transmitter 30 followed by a (virtual) multiplier 35 for introducing the rotating phase disruption (Exp(j*(PhaseDis)) 14) followed by channel 40 that is followed by a (virtual) adder 50 that adds the additive noise 12 to provide a received signal 15 that is received by the coherent receiver 23.

The coherent receiver 23 is illustrates as including an analog to digital converter (denoted "ADC") 60 that outputs an input digital signal 18 to the equalizer and phase corrector 71 and to the channel estimator 90.

The equalizer and phase corrector 71 performs equalization and perform phase difference estimation (provides phase estimate $\widehat{Phase}$ ) and performs phase correction (to enable recovery of constellation symbol) and outputs to the slicer 80 an equalized signal. The slicer 80 outputs a slicer output signal that may be estimation of the transmitted signal $\hat{x}$ 19 to the phase re-addition unit 85.

The phase re-addition unit 85 is configured to apply the estimated phase over $\hat{x}$ 19 to provide another transmitted signal estimation $\bar{x}$. Whereas $\bar{x}=\hat{x}\cdot\exp(j\cdot(\overline{phase}))$. The another transmitted signal estimation $\bar{x}$ is fed to the channel estimator. The channel estimator also receives input digital signal 18—and outputs a channel estimation $\hat{h}$ 20.

This prior art method for channel estimation at the presence of phase difference is complex, exhibits a high latency, and requires a lengthy and problematic initialization process.

The complexity result from the addition of the phase re-addition block that is expensive and requires to apply a complex multiplier over each estimated signal.

Latency—phase correction and phase re-addition units are time consuming and add latency, making the scheme less suitable for timing detectors, as timing detectors may be extremely sensitive to latency.

Initialization of multiple blocks (equalizer, phase correction and phase re-addition units) is very complicated and may be even impractical.

There is a growing need to provide an efficient method for reconstructing signals in the presence of a phase difference between the transmitted signal and the received signal.

SUMMARY

There may be provided devices, methods, and computer readable medium as illustrated in the specification.

BRIEF DESCRIPTION OF THE DRAWINGS

The embodiments of the disclosure will be understood and appreciated more fully from the following detailed description, taken in conjunction with the drawings in which:

FIG. 7 is an example of a method;
FIG. 8 is an example of a method;
FIG. 9 is an example of a method;
FIG. 10 is an example of a method;
FIG. 11 is an example of an adjustment of an equalizer.

DESCRIPTION OF EXAMPLE EMBODIMENTS

Figure 1:
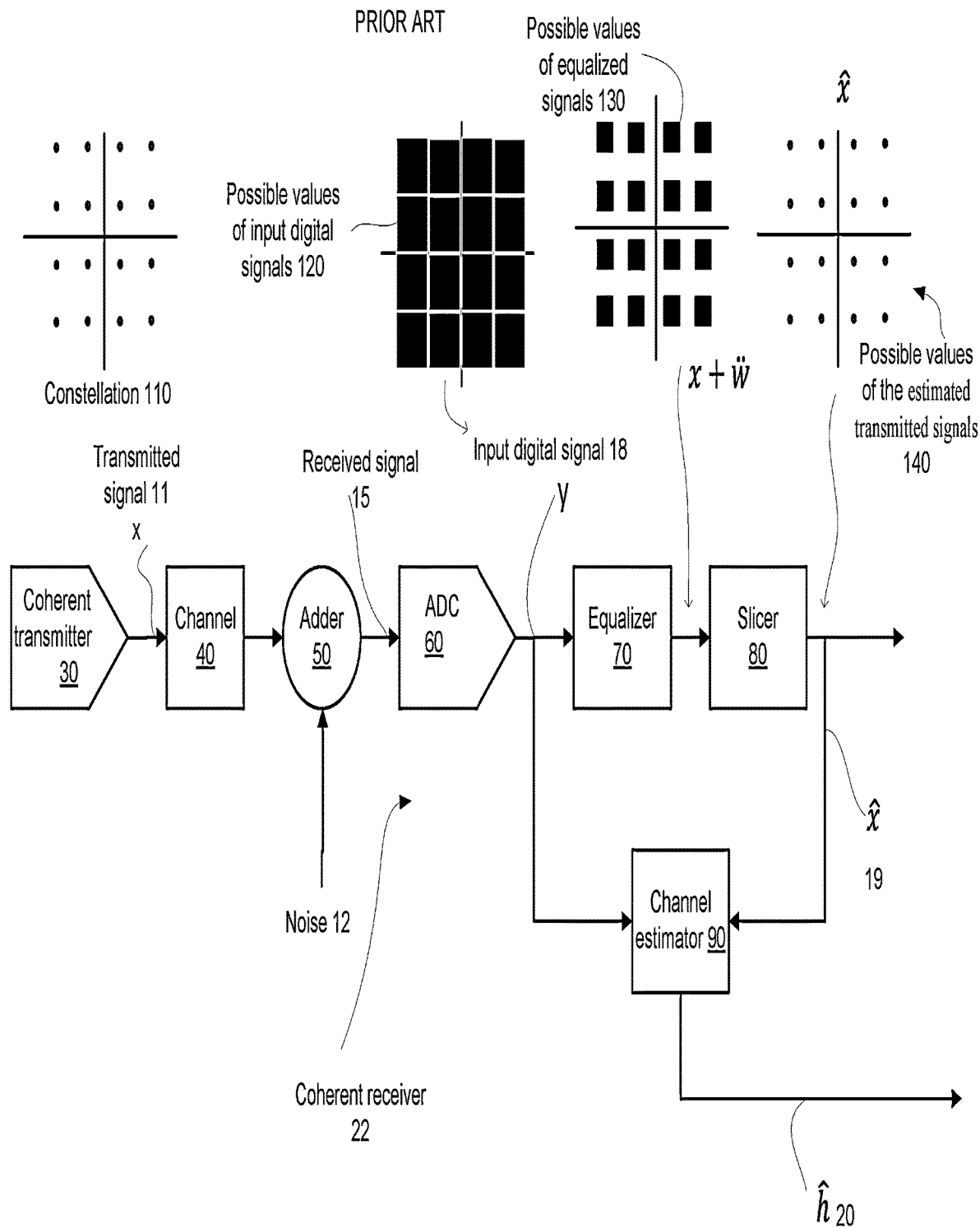
FIG. 1 is an example of a prior art system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The term "and/or" means additionally or alternatively. Thus—A and/or B may be only A, only B or a combination of A and B.

Any reference to a signal should be applied mutatis mutandis to a symbol.

There may be provided a method, a system, and a computer readable medium for signal reconstruction.

The system exhibits a similar complexity, and/or similar latency and/or initialization and/or similar resources as a system capable of managing amplitude noises and not rotating phase noises.

There are multiple reasons that may contribute to a phase difference between the transmitted signal and the received signal. For example—there is a rotating phase disruption and an additive phase noise. Any reference to one contributor may be applied mutatis mutandis to the other contributor and/or to a combination of contributors.

Figure 3:
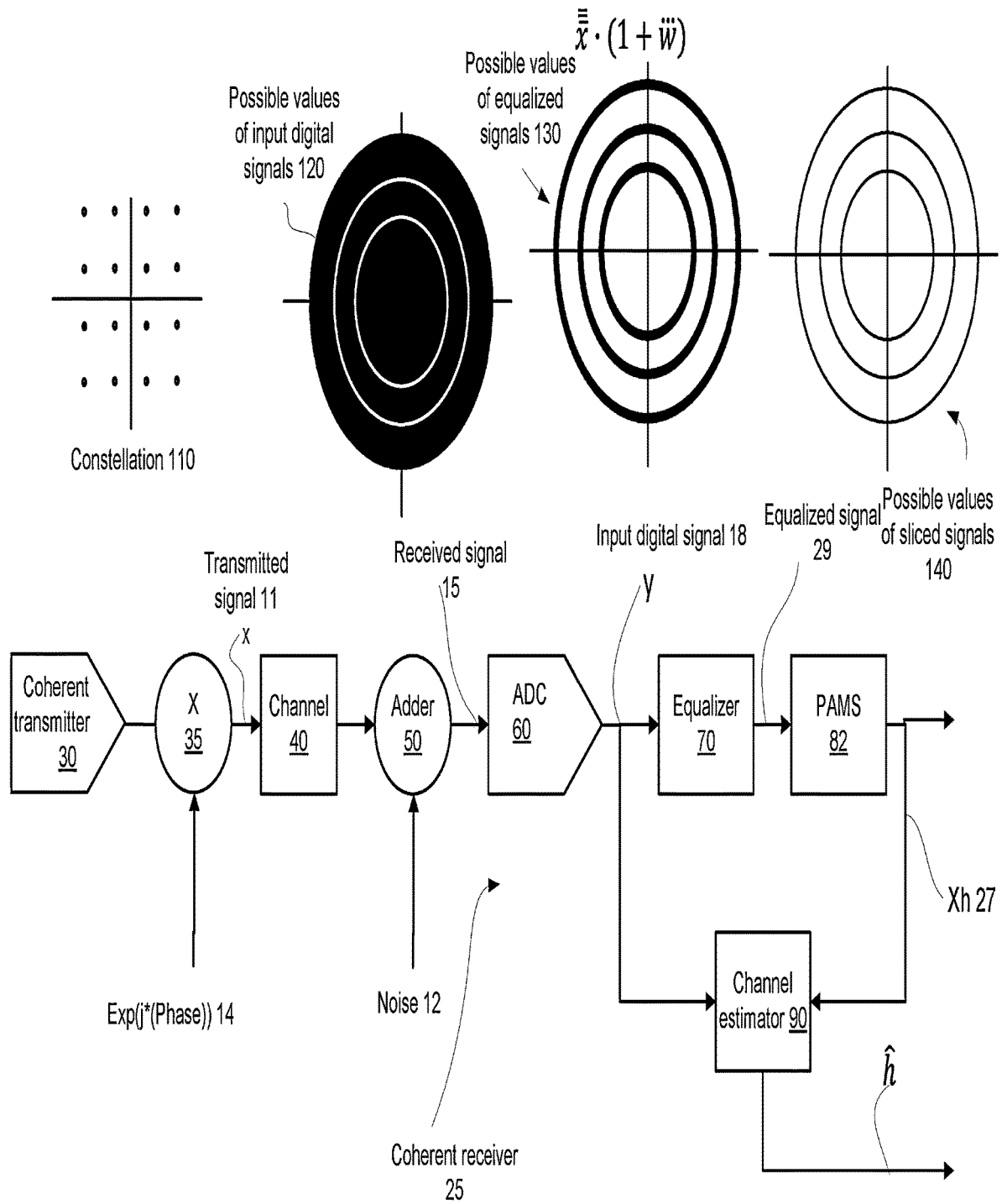
FIG. 3 is an example of a system.

FIG. 3 illustrates an example of a system that copes with additive noise and a rotating phase disruption.

The system includes a coherent transmitter 30 followed by a (virtual) multiplier 35 for introducing the rotating phase disruption (Exp(j*(PhaseDis)) 14 that is followed by channel 40. Channel 40 is followed by a (virtual) adder 50 that adds the additive noise 12 to provide a received signal 15. The received signal is received by the coherent receiver 25.

The coherent receiver 25 is illustrates as including an analog to digital converter (denoted "ADC") 60 that outputs an input digital signal 18 to the equalizer 70 and to the channel estimator 90.

The equalizer outputs an equalized signal 29 to a phase maintaining amplitude slicer (PAMS) 82.

PAMS 82 outputs a hybrid signal 27 that represents a magnitude of the transmitted signal and a phase of the received signal.

Thus—the coherent receiver—at least until the generation of the hybrid signal by the PAMS—maintains the phase information of the received signal.

It is assumed that the phase of the input digital signal equals the phase of the received signal. Any phase difference between the input digital signal and the received signal may be compensated in any manner.

The input digital signal 18 and the hybrid signal 27 are fed to channel estimator 90 that outputs a channel estimation $\hat{h}$ 20.

FIG. 3 also illustrates the possible values of the input digital signals 120, and the possible values of the equalized signals 130. The possible values of the input digital signals illustrates overlaps between possible values that are associated with different constellation symbols.

PAMS 82 may estimate the hybrid signal without estimating the phase difference between the transmitted signal and the received signal.

PAMS 82 may estimate the hybrid signal without performing the functionality of the phase estimator and the phase re-addition unit. This may referred to as a direct estimation of the hybrid signal—in contrary to the multiple-phase solution of the prior art system of FIG. 2 that estimates $\hat{x}$ and then calculates $\hat{\bar{x}}$ from $\hat{x}$.

Figure 2:
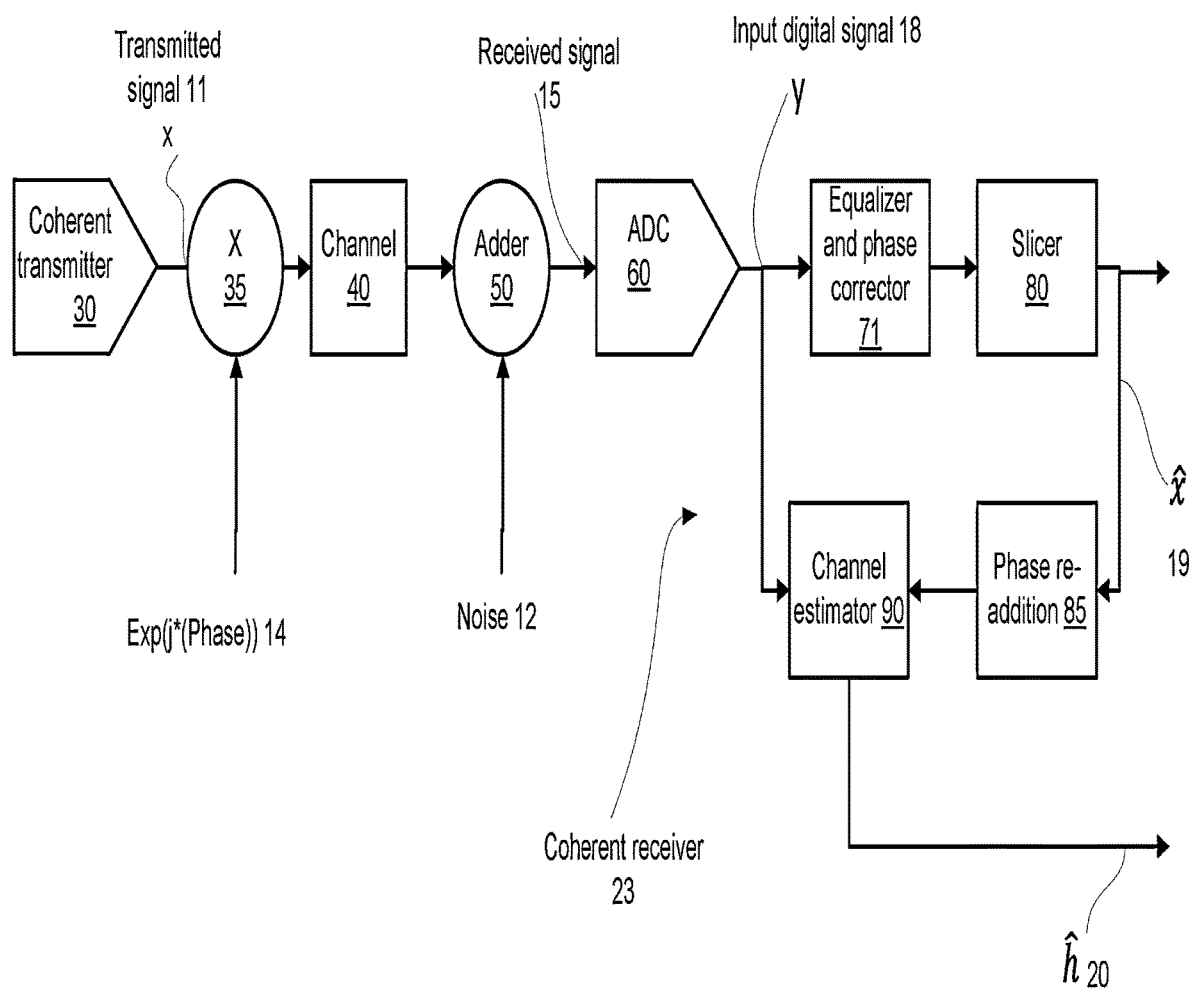
FIG. 2 is an example of a prior art system.

The PMAS 82 may not require knowledge of the phase difference (between the transmitted signal and the received signal), thus it does not depend on any assistance of a phase loop such as the phase loop of the system of FIG. 2.

The input digital signal 18 outputted by ADC 60 may be represented by $y=(x \cdot \exp(j \cdot (PhaseDiff)))*h+w=\bar{x}*h+w \equiv \bar{x}*h \cdot (1+w_1) \cdot \exp(j \cdot w_2)$, whereas $w_1$, $w_2$ are projections of the additive noise w to amplitude noise and phase noise.

The equalizer inverts the channel h, whereas the inverted channel response is denoted $h^{-1}$ $$z = y * h^{-1} =$$
$$\left(\bar{\bar{x}} * h \cdot (1+w_1) \cdot \exp(j \cdot w_2)\right) * h^{-1} = \bar{\bar{x}} \cdot \exp(j \cdot w_2) \cdot (1+\tilde{w}) = \bar{\bar{x}} \cdot (1+\tilde{\tilde{w}})$$

The transmitted signal x may be a signal from a known finite complex alphabet (from a predefined constellation).

Assuming that the constellation is represented by a radial representation. The radial representation of a constellation is indicative of predefined known values of the transmitted signal. The constellation may include one or more groups of constellation symbols that share the same radius (distance from the point of origin).

Figure 4:
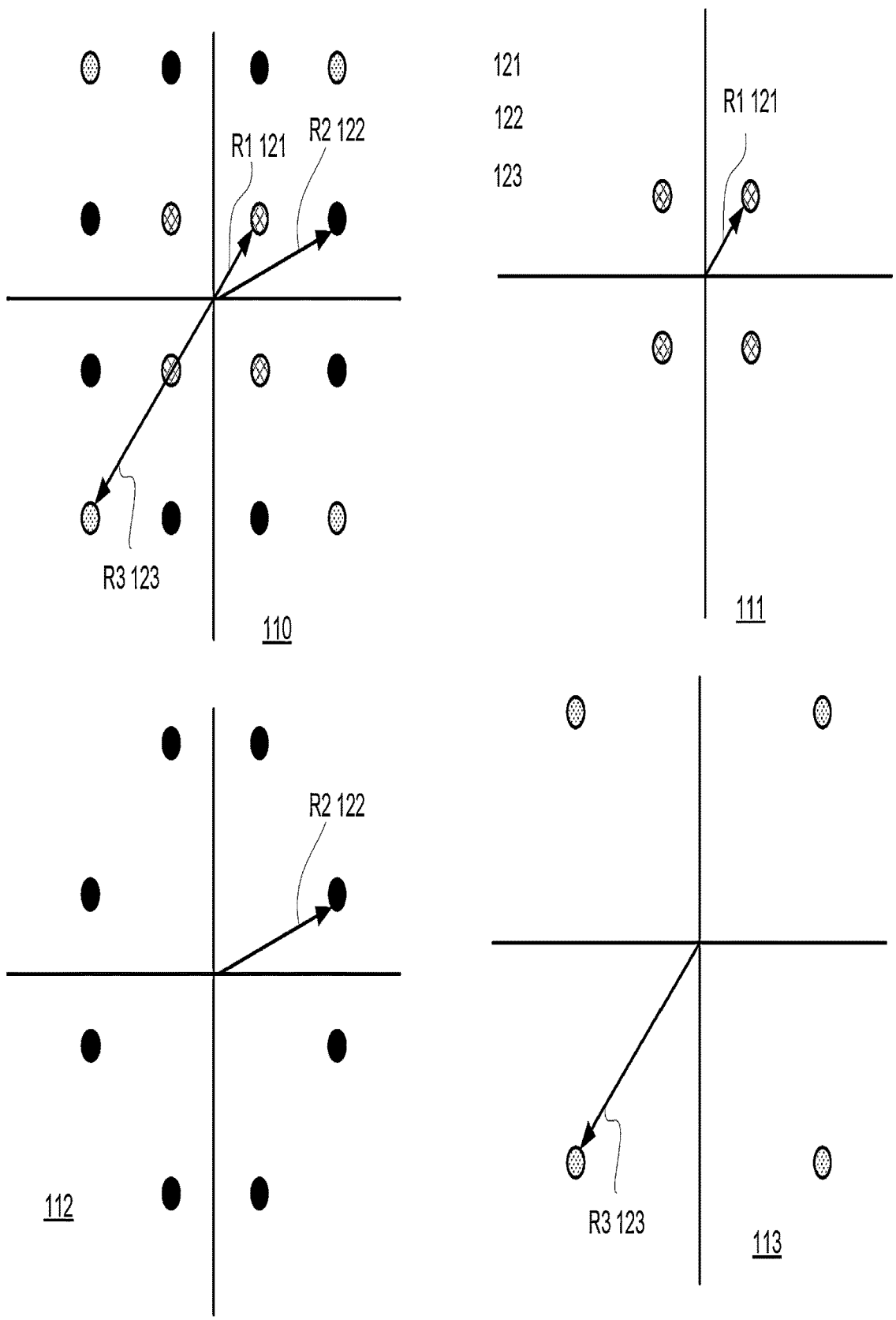
FIG. 4 is an example of a groups of constellation symbols.

For example—referring to FIG. 4 illustrating a constellation of a sixteen state quadrature amplitude modulation (16-QAM)—it includes four by four symbols that appear as a four by four grid in a graph having its x-axis representing in-phase data and its y-axis representing quadrature data. The in-phase data and the quadrature data may be transmitted at different polarizations.

The 16-QAM constellation includes three groups of constellation symbols that are associated with three different radiuses.

The first group 111 includes the four constellation symbols that are the closets to the point of origin and are associated with a first radius R1 121.

The second group 112 includes the eight constellation symbols that are located at an intermediate distance from the point of origin and are associated with a second radius R2 122.

The third group 113 includes the four constellation symbols that are the most distant from the point of origin and are associated with a third radius R3 123.

Figure 5:
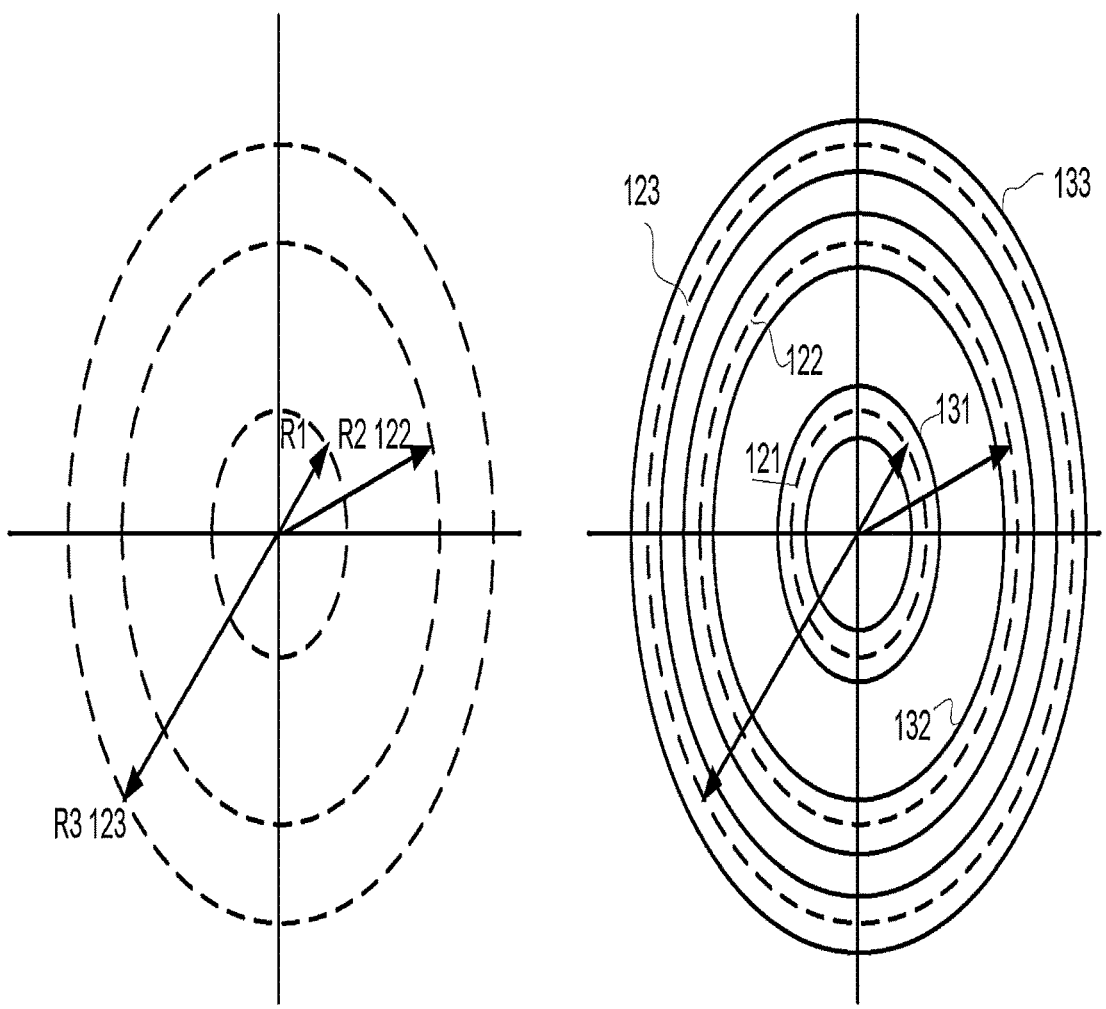
FIG. 5 is an example of a radiuses of groups of constellation symbols and of annular regions.

Referring to left side of FIG. 5—the three radiuses are represented by rings 121, 122 and 123 in a polar representation.

Referring to the right side of FIG. 5—an output signal of an equalizer may reside within an annular region (such as one annular region out of first annular region 131, second annular region 132 and third annular region 133). Each annular region includes a ring that represents a certain radius of the constellation symbols. The annular region is wider than the ring due to the added amplitude noise.

Figure 6:
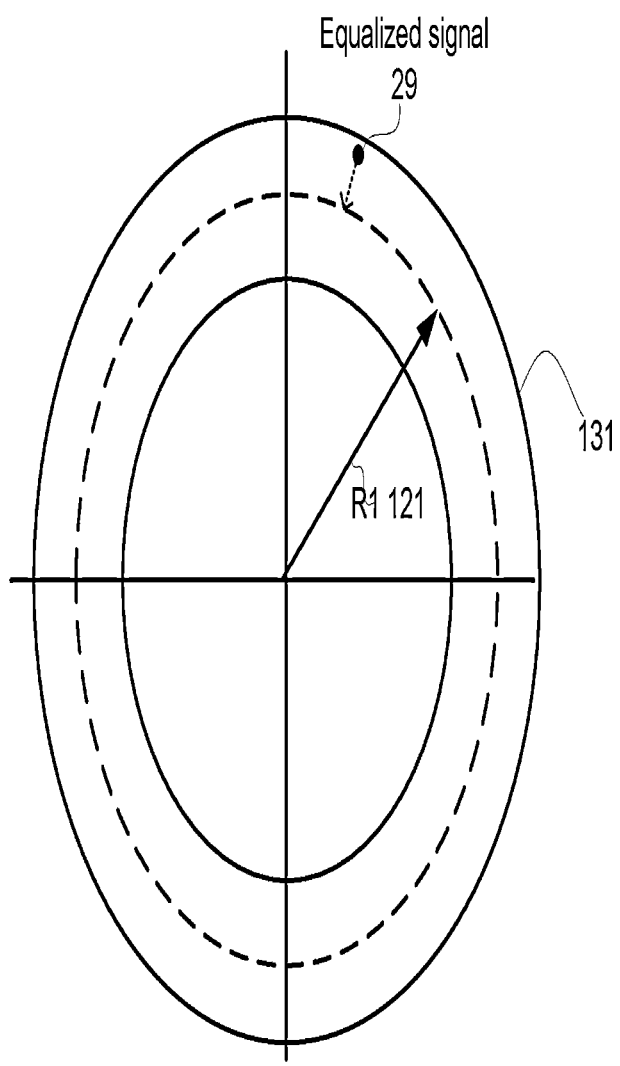
FIG. 6 is an example of an equalized signal, a relevant radius and a relevant annular region.

Referring to FIG. 6—it is assumed that a certain equalized signal 29 falls within the first annular region 131 and the PAMS assigned is with an amplitude value that equals the first radius 121.

The PAMS maintains the phase information (in FIG. 6 is it the angle to the x-axis) and output a hybrid signal that has an amplitude of the transmitted signal and the phase of the received signal.

While the PAMS does not calculate the phase difference, it should be noted that the phase of the transmitted signal should be one of the phases defined in the symbol constellation.

Assuming that the transmitted signal has a polar representation:

$x = R \cdot \exp(j \cdot \theta)$.

R is a positive real number from a finite known alphabet of "rings"

θ is a real number from a finite known alphabet of "phases".

$\bar{x}$ & $\bar{\bar{x}}$ undergo phase rotations, but their magnitude remains R from the same alphabet of "rings"

The PMAS 82 may execute the following steps:

Take the absolute value of $z: |z| = |\bar{\bar{x}} \cdot (1+\tilde{\tilde{w}})| = R \cdot |(1+\tilde{\tilde{w}})|$ Compare $|z|$ to the rings in the alphabet and select the closest one $\hat{R}$ Normalize z by its own magnitude and multiply it with $\hat{R}$:

$$HybridSignal = \frac{z}{|z|} \cdot \hat{R}$$

Assuming we estimated $\hat{R}=R$, the PMAS output estimates $\bar{x}$ with additional phase noise caused by the projection of w on the phase.

The hybrid signal differs from $\bar{x}$.

FIG. 7 illustrates an example of method 300 for signal reconstruction.

Method 300 may start by step 310 of obtaining an input digital signal that is a digital representation of a received optical signal. The received optical signal represents a transmitted optical signal that was transmitted by a coherent transmitter and over a channel to a coherent optical receiver. The phase difference between the transmitted optical signal and the received optical signal is unknown when the received signal is received.

Step 310 may be followed by step 330 of generating a hybrid estimation.

The hybrid estimation represents a magnitude of the transmitted optical signal and a phase of the received optical signal.

Step 330 may be executed without a-priory knowledge of a value of the transmitted optical signal. Thus—method 300 is applicable in a blind communication scheme.

Step 330 may include utilizing a radial representation of a constellation indicative of predefined known values of the transmitted optical signal. The utilizing of the radial representation may include selecting a selected radius value out of at least one radius values; wherein each radius of the at least one radius values represents a group of constellation symbols that share a same radius.

The constellation may be represented by multiple radius values.

Step 330 may include maintaining the phase information of the received optical signal.

Step 330 may be executed without estimating the phase difference between the transmitted optical signal and the received optical signal. This simplifies the execution of step 330, and reduces the latency introduced by step 330.

Step 330 may be executed without performing the functionality of the phase estimator and the phase re-addition unit of FIG. 2. Thus—step 330 may be referred to as a directly generating the hybrid signal—in contrary to the multiple-phase solution of the prior art system of FIG. 2 that estimates $\hat{x}$ and then calculates $\bar{x}$ from $\hat{x}$.

Step 330 also does not require knowledge of the phase difference, thus it does not depend on any assistance of a phase loop such as the phase loop of the system of FIG. 2.

Step 330 may include step 331 of generating, by an equalizer, an initial estimation of the transmitted optical signal; and step 332 of processing the initial estimation by a phase maintaining amplitude slicer to provide the hybrid estimation.

The initial estimation of the transmitted optical signal may have a value that is located within an annular region that covers a radial range that includes a certain radius, the certain radius is shared by members of a group of constellation symbols.

Step 330 may be followed by step 350 of responding to the generation of the hybrid estimation. This may include processing the hybrid estimation.

Step 350 may include at least one of the following:
Generating a channel estimate of the channel.
Performing a timing detection process. This may include performing the Mueller and Muller timing detection process. Timing detection processes such as the Mueller and Muller timing detection process are very sensitive to latency and the reduction of latency provided by method 300 dramatically improves the accuracy of timing detection processes such as the Mueller and Muller timing detection.

Estimating the phase difference between the transmitted optical signal and the received optical signal.

Equalizer coefficient calculation and equalizer tracker.

Any of the mentioned example of step 350 may be executed regardless of a calculation of a channel estimation. See—for example—FIGS. 11 and 12 that illustrates an adjustment of an equalizer (FIG. 11) and an adjustment of an ADC (especially adjusting the timing of the sampling done by the ADC)—that may be executed regardless of the channel estimation—by a coherent optical receiver that does perform channel estimation or by a coherent optical receiver that does not perform channel estimation. The same can be applied mutatis mutandis on any of the following methods.

FIG. 8 illustrates an example of method 400 for signal reconstruction.

While method 300 is related to optical communication—method 400 is applicable to radio frequency signals and optical signals.

Method 400 may start by step 410 of obtaining an input digital signal that is a digital representation of a received signal that is an optical signal or a radio frequency signal, wherein the received signal represents a transmitted signal that was transmitted by a coherent transmitter and over a channel to a coherent receiver; wherein a phase difference between the transmitted signal and the received signal is unknown.

Step 410 may be followed by step 430 of generating a hybrid estimation, wherein the hybrid estimation represents a magnitude of the transmitted signal and a phase of the received signal.

Step 430 may include maintaining the phase information of the input signal.

Step 430 may be executed without estimating the phase difference between the transmitted signal and the input signal. This simplifies the execution of step 340, and reduces the latency introduced by step 340.

Step 430 may be executed without performing the functionality of the phase estimator and the phase re-addition unit of FIG. 2. Thus—step 430 may be referred to as a directly generating the hybrid signal—in contrary to the multiple-phase solution of the prior art system of FIG. 2 that estimates $\hat{x}$ and then calculates $\bar{x}$ from $\hat{x}$.

Step 430 also does not require knowledge of the phase difference, thus it does not depend on any assistance of a phase loop such as the phase loop of the system of FIG. 2.

Step 430 may include generating, by an equalizer, an initial estimation of the transmitted signal; and processing the initial estimation by a phase maintaining amplitude slicer to provide the hybrid estimation.

Step 430 may be followed by step 450 of responding to the generation of the hybrid estimation. This may include processing the hybrid estimation.

FIG. 9 illustrates an example of method 500 for signal reconstruction.

Method 500 may start by step 510 of obtaining by a coherent receiver a radial representation of a constellation indicative of predefined known values of a transmitted signal; wherein the constellation comprises a plurality of groups of symbols, wherein symbols of a group of symbols share a same radius, wherein different groups of symbols are associated with different radiuses.

Step 510 may be followed by step 530 of receiving, by the coherent receiver, a received signal that is an optical signal or a radio frequency signal. The received signal represents a transmitted signal that was transmitted by a coherent transmitter and over a channel to a coherent receiver; wherein a phase difference between the transmitted signal and the received signal is unknown.

Step 530 may be followed by step 550 of determining at least amplitude information regarding an amplitude of the transmitted signal, wherein the determining utilizes the radial representation of the constellation.

Step 550 may include maintaining the phase information of the received optical signal.

Step 550 may be executed without estimating the phase difference between the transmitted optical signal and the received optical signal. This simplifies the execution of step 550, and reduces the latency introduced by step 550.

Step 550 may be executed without performing the functionality of the phase estimator and the phase re-addition unit of FIG. 2. Thus—step 550 may be referred to as a directly generating the hybrid signal—in contrary to the multiple-phase solution of the prior art system of FIG. 2 that estimates $\hat{x}$ and then calculates $\bar{x}$ from $\hat{x}$.

Step 550 also does not require knowledge of the phase difference, thus it does not depend on any assistance of a phase loop such as the phase loop of the system of FIG. 2.

Step 550 may include generating, by an equalizer, an initial estimation of the transmitted optical signal and processing the initial estimation by a phase maintaining amplitude slicer to provide the outcome of the determination.

Step 550 may be followed by step 570 of responding to the determination of step 550. This may include processing the outcome of step 570.

FIG. 10 illustrates an example of method 600 for signal reconstruction.

Method 600 may start by step 610 of obtaining, an input digital signal by an adaptive filter of a coherent optical receiver; wherein the input digital signal is a digital representation of an received optical signal, wherein the received optical signal represents a transmitted optical signal that was transmitted by a coherent transmitter and over a channel to the coherent optical receiver; wherein a phase difference between the transmitted optical signal and the received optical signal is unknown. The adaptive filter may be an equalizer.

Step 610 may be followed by step 620 of filtering the input digital signal, by the adaptive filter, to provide a filtered digital signal; wherein the filtering maintains phase information of the received optical signal unchanged.

Step 620 may be followed by step 630 of selecting, based on a magnitude of the filtered digital signal and out of at least one radius values, a selected radius value; wherein each of the at least one radius values represents a group of constellation symbols that share a same radius; wherein the selected radius value is indicative of an amplitude of the transmitted optical signal.

Step 630 may be followed by step 640 of providing an estimated signal that exhibits the selected radius and a phase of the received optical signal.

Step 640 may be followed by step 650 of responding to the outcome of step 640. For example—processing the estimated signal.

The hybrid signal and at least one of the input digital signal and an output signal of the equalizer may be used, for example for one or more of the following:
  Baud rate coherent timing detector, a generalization of the Mueller and Muller timing detection
  Equalizer coefficients calculation and tracking
  Noise estimation, including capability to measure phase noise and amplitude noise separately
  Decision aided calibration
  Characterization/Testing/sorting and many more FIG. 11 is an example of an adjustment of an equalizer. The adjustment may include changing one or more coefficient of the equalizer or any other change that will affect the filtering applied by the equalizer.

FIG. 11 illustrates the ADC 60 followed by the equalizer and the PAMS 82. The hybrid signal Xh outputted from PAMS 82 and the equalized signal (output signal from the equalizer) are fed to a subtractor 52 that outputs an error signal 701 which equals the hybrid signal minus the equalized signal. The error signal 701 is fed to adaptation unit 72 that is configured to adjust the equalizer (by sending an equalized adjustment signal 702) according to any predefined adjustment function that is responsive to the error signal.

FIG. 11 also illustrates that a coherent receiver that include the ADC, the PAMS, the subtractor, the adaptation unit, as well as the channel estimator 90.

Assuming that the adaptation is based on least means square (LMS) than the adaptation may include adapts the coefficients of the equalizer directly to minimize an error criteria.

The suggested LMS equalizer tracking may include:
An input signal x, goes through equalizer coefficient w to generate $y: y[n] = \Sigma_0^{L-1} w_k \cdot x[n-k]$
A PMAS may take y[n] and provides a hybrid signal.
The OMAS error can be calculated $e[n] = y[n] - \overline{Xh}[n]$
The LMS algorithms tries to minimize the energy of the error, by moving each coefficient against the derivative of the energy of the error to the coefficient:
The derivative of the squared error:

$$\frac{\partial E(|e[n]|^2)}{\partial w_k} = 2 \cdot e[n] \cdot E \frac{\partial (e^*[n])}{\partial w_k} = 2 \cdot e[n] \cdot x^*[n-k]$$

The LMS update rule: $w_k(\text{next}) = w_k(\text{current}) - \mu e[n] \cdot x^*[n-k]$, $\mu$ is a step size to control tracking rate It should be noted that the equalizer is an example of a filter and that the mentioned above adaptation process may be applied mutatis mutandis on other filters p such as echo/NEXT/FEXT cancellers, DC/Gain filters, and the like.

Figure 12:
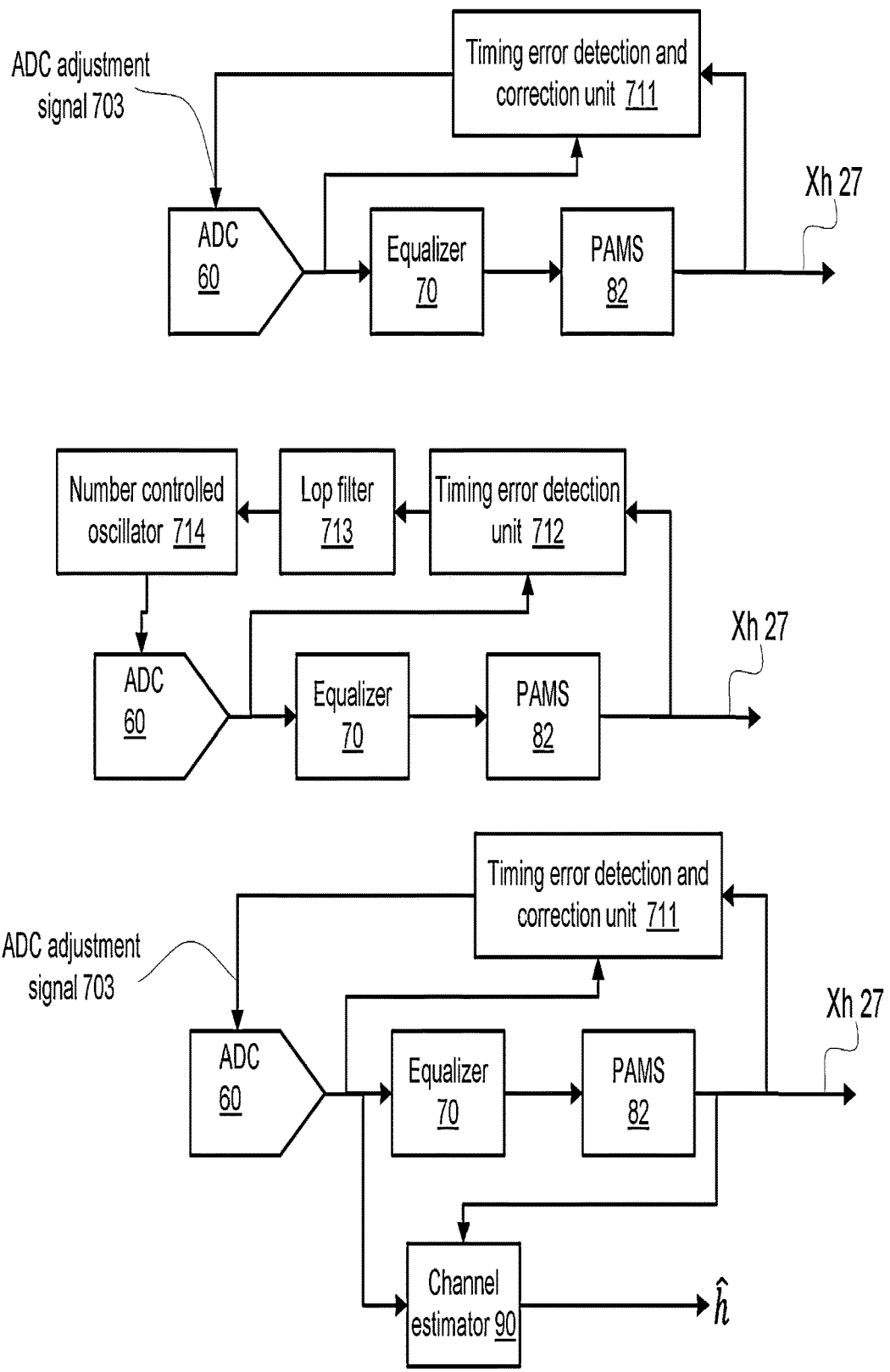
FIG. 12 is an example of an adjustment of an analog to digital converter.

FIG. 12 is an example of an adjustment of an analog to digital converter using a timing error detection process. The goal of the timing error detector is to adjust the timing of sampling of the ADC.

FIG. 12 illustrates the ADC 60 followed by the equalizer and the PAMS 82. The hybrid signal Xh outputted from PAMS 82 and the input digital signal (output signal from the ADC) are fed to a timing error detection and correction unit 711 that outputs an ADC adjustment signal 703 that adjusts the timing of sampling of the ADC.

FIG. 12 also illustrates an example in which the timing error detection and correction unit include a timing error detection unit 712 (such as the Mueller and Muller timing detection unit), a loop filter 713 and a number controlled oscillator 714.

FIG. 12 also illustrates that a coherent receiver that includes the ADC, the PAMS, the timing error detection and correction unit 711, as well as the channel estimator 90.

The suggested ADC adjustment, assuming using Mueller and Muller (MM) timing detection unit may include:
Mueller & Muller (MM) is a popular scheme for timing error detection in baud rate processing systems Baud rate sampling rate is below the Nyquist sampling rate—therefore the sampled signal can't be re-sampled, and only one sampling phase is available.

The MM timing error detection correlates the sampled signal and the PMAS decisions with delayed versions of each other:

$$\widehat{h_1} = x(n) \cdot (\widehat{Xh}[n-1])^* \widehat{h_{-1}} = x(n-1) \cdot (X\widehat{h}[n])^* TED = E(\widehat{h_1} - \widehat{h_{-1}})$$

The motivation behind the MM algorithm is channel estimation. $\widehat{h_1}$, $\widehat{h_{-1}}$ are estimator for the pre and post curser channel coefficients.

The algorithm aims to move the sampling phase so that $\widehat{h_1} = \widehat{h_{-1}}$, which means the channel is symmetric.

There may be provided a method for signal reconstruction, the method may include obtaining, an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and generating a hybrid estimation, wherein the hybrid estimation represents a magnitude of the transmitted optical signal and a phase of the received optical signal.

The generating of the hybrid estimation may be executed without a-priory knowledge of a value of the transmitted optical signal.

The generating of the hybrid estimation may include utilizing a radial representation of a constellation indicative of predefined known values of the transmitted optical signal.

The utilizing of the radial representation may include selecting a selected radius value out of at least one radius values; wherein each radius of the at least one radius values represents a group of constellation symbols that share a same radius.

The at least one radius values are multiple radius values.

The generating of the hybrid estimation maintains phase information of the received optical signal.

The generating of the hybrid estimation may be executed without estimating the phase difference between the transmitted optical signal and the received optical signal.

The generating of the hybrid estimation may include generating, by an equalizer, an initial estimation of the transmitted optical signal; and processing the initial estimation by a phase maintaining amplitude slicer to provide the hybrid estimation.

The initial estimation of the transmitted optical signal has a value that may be located within an annular region that covers a radial range that may include a certain radius, the certain radius may be shared by members of a group of constellation symbols.

The method may include processing the hybrid estimation.

The processing may include generating a channel estimate of the channel.

The processing may include performing a timing detection process.

The timing detection process may be a Mueller and Muller timing detection process.

The processing may include estimating the phase difference between the transmitted optical signal and the received optical signal.

The processing may include at least one of equalizer coefficient calculation and equalizer tracker.

There may be provided a device having signal reconstruction capability, the device may include units that are configured to obtain an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and generate a hybrid estimation, wherein the hybrid estimation represents a magnitude of the transmitted optical signal and a phase of the received optical signal.

The device may be a coherent receiver, may include a coherent receiver, may be a part of a coherent receiver, may be a combination of an equalizer and a phase maintaining amplitude slicer, may include units other than the equalizer and the phase maintaining amplitude slicer, and the like.

The unit may include a combination of an equalizer and a phase maintaining amplitude slicer, may include additional units, other units, and the like. A unit may be a part of an integrated circuit, may include more than a part of an integrated circuit, may be implemented in hardware and/or code and/or instruction and the like. When implemented by code and/or instructions—the code and/or instructions may be stored in at least one non-transitory computer readable medium.

The receiver may be configured to generate the hybrid estimation without a-priory knowledge of a value of the transmitted optical signal.

The units are configured to generate the hybrid estimation by utilizing a radial representation of a constellation indicative of predefined known values of the transmitted optical signal.

The units are configured to utilize the radial representation of the constellation by selecting a selected radius value out of at least one radius values; wherein each radius of the at least one radius values represents a group of constellation symbols that share a same radius.

The at least one radius values are multiple radius values.

The units are configured to generate the hybrid estimation while maintaining phase information of the received optical signal.

The units are configured to generate the hybrid estimation without estimating the phase difference between the transmitted optical signal and the received optical signal.

The units may include an equalizer that may be configured to generate an initial estimation of the transmitted optical signal, and a phase maintaining amplitude slicer that may be configured to process the initial estimation and provide the hybrid estimation.

The initial estimation of the transmitted optical signal has a value that may be located within an annular region that covers a radial range that may include a certain radius, the certain radius may be shared by members of a group of constellation symbols.

The units are further configured to process the hybrid estimation.

The units may include a channel estimator configured to process the hybrid estimation by generating a channel estimate of the channel.

The units may include a timing error detection and correction unit configured to process the hybrid estimation by performing a timing detection process.

The timing detection process may be a Mueller and Muller timing detection process.

The processing may include estimating the phase difference between the transmitted optical signal and the received optical signal.

The units may include an equalizer and an adaptation unit for adapting the equalizer.

There may be provided non-transitory computer readable medium for signal reconstruction, the non-transitory computer readable medium stores instructions for obtaining, an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and generating a hybrid estimation, wherein the hybrid estimation represents a magnitude of the transmitted optical signal and a phase of the received optical signal.

There may be provided a method for signal reconstruction, the method may include obtaining, an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and generating a hybrid estimation, wherein the hybrid estimation represents a magnitude of the transmitted optical signal and a phase of the received optical signal.

There may be provided a device for signal reconstruction, the device may include units that are configured to obtain an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and generate a hybrid estimation, wherein the hybrid estimation represents a magnitude of the transmitted optical signal and a phase of the received optical signal.

There may be provided non-transitory computer readable medium for signal reconstruction, the non-transitory computer readable medium stores instructions for obtaining, an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and generating a hybrid estimation, wherein the hybrid estimation represents a magnitude of the transmitted optical signal and a phase of the received optical signal.

There may be provided a method for signal reconstruction, the method may include obtaining, an input digital signal that is a digital representation of a received signal that is an optical signal or a radio frequency signal, wherein the received signal represents a transmitted signal that was transmitted by a coherent transmitter and over a channel to a coherent receiver; wherein a phase difference between the transmitted signal and the received signal is unknown; and generating a hybrid estimation, wherein the hybrid estimation represents a magnitude of the transmitted signal and a phase of the received signal.

There may be provided a device for signal reconstruction, the device may include units that are configured to obtain an input digital signal that is a digital representation of a received signal that may be an optical signal or a radio frequency signal, wherein the received signal represents a transmitted signal that was transmitted by a coherent transmitter and over a channel to a coherent receiver; wherein a phase difference between the transmitted signal and the received signal is unknown; and generate a hybrid estimation, wherein the hybrid estimation represents a magnitude of the transmitted signal and a phase of the received signal.

There may be provided non-transitory computer readable medium for signal reconstruction, the non-transitory computer readable medium stores instructions for obtaining, an input digital signal that is a digital representation of a received signal that may be an optical signal or a radio frequency signal, wherein the received signal represents a transmitted signal that was transmitted by a coherent transmitter and over a channel to a coherent receiver; wherein a phase difference between the transmitted signal and the received signal is unknown; and generating a hybrid estimation, wherein the hybrid estimation represents a magnitude of the transmitted signal and a phase of the received signal.

There may be provided a method for signal reconstruction, the method may include obtaining by a coherent receiver a radial representation of a constellation indicative of predefined known values of a transmitted signal; wherein the constellation may include a plurality of groups of symbols, wherein symbols of a group of symbols share a same radius, wherein different groups of symbols are associated with different radiuses; receiving, by the coherent receiver, a received signal that may be an optical signal or a radio frequency signal; and determining at least amplitude information regarding an amplitude of the transmitted signal, wherein the determining utilizes the radial representation of the constellation.

There may be provided a device for signal reconstruction, the device may include units that are configured to obtain a radial representation of a constellation indicative of predefined known values of a transmitted signal; wherein the constellation may include a plurality of groups of symbols, wherein symbols of a group of symbols share a same radius, wherein different groups of symbols are associated with different radiuses; receive a received signal that may be an optical signal or a radio frequency signal; and determine at least amplitude information regarding an amplitude of the transmitted signal, wherein the determining utilizes the radial representation of the constellation.

There may be provided non-transitory computer readable medium for signal reconstruction, the non-transitory computer readable medium stores instructions for obtaining by a coherent receiver a radial representation of a constellation indicative of predefined known values of a transmitted signal; wherein the constellation may include a plurality of groups of symbols, wherein symbols of a group of symbols share a same radius, wherein different groups of symbols are associated with different radiuses; receiving, by the coherent receiver, a received signal that may be an optical signal or a radio frequency signal; and determining at least amplitude information regarding an amplitude of the transmitted signal, wherein the determining utilizes the radial representation of the constellation.

There may be provided a method for signal reconstruction, the method may include obtaining, an input digital signal by an adaptive filter of a coherent optical receiver; wherein the input digital signal is a digital representation of a received optical signal, wherein the received optical signal represents a transmitted optical signal that was transmitted by a coherent transmitter and over a channel to the coherent optical receiver; wherein a phase difference between the transmitted optical signal and the received optical signal is unknown; filtering the input digital signal, by the adaptive filter, to provide a filtered digital signal; wherein the filtering maintains phase information of the received optical signal unchanged; selecting, based on a magnitude of the filtered digital signal and out of at least one radius values, a selected radius value; wherein each of the at least one radius values represents a group of constellation symbols that share a same radius; wherein the selected radius value may be indicative of an amplitude of the transmitted optical signal; and providing an estimated signal that exhibits the selected radius and a phase of the received optical signal.

There may be provided a coherent receiver that may include an adaptive filter configured to: receive an input digital signal; wherein the input digital signal is a digital representation of a received optical signal, wherein the received optical signal represents a transmitted optical signal that was transmitted by a coherent transmitter and over a channel to the coherent optical receiver; wherein a phase difference between the transmitted optical signal and the received optical signal is unknown; filter the input digital signal to provide a filtered digital signal; wherein the filtering maintains phase information of the received optical signal unchanged; and a phase maintaining amplitude slicer that may be configured to select, based on a magnitude of the filtered digital signal and out of at least one radius values, a selected radius value; wherein each of the at least one radius values represents a group of constellation symbols that share a same radius; wherein the selected radius value may be indicative of an amplitude of the transmitted optical signal; and provide an estimated signal that exhibits the selected radius and a phase of the received optical signal.

There may be provided non-transitory computer readable medium for signal reconstruction, the non-transitory computer readable medium stores instructions for obtaining, an input digital signal by an adaptive filter of a coherent optical receiver; wherein the input digital signal is a digital representation of a received optical signal, wherein the received optical signal represents a transmitted optical signal that was transmitted by a coherent transmitter and over a channel to the coherent optical receiver; wherein a phase difference between the transmitted optical signal and the received optical signal is unknown; filtering the input digital signal, by the adaptive filter, to provide a filtered digital signal; wherein the filtering maintains phase information of the received optical signal unchanged; selecting, based on a magnitude of the filtered digital signal and out of at least one radius values, a selected radius value; wherein each of the at least one radius values represents a group of constellation symbols that share a same radius; wherein the selected radius value may be indicative of an amplitude of the transmitted optical signal; and providing an estimated signal that exhibits the selected radius and a phase of the received optical signal.

Any value or number referred to in the application may be a non-limiting example of such a value of number. For example—the number of demodulators per coherent receiver may differ from two, the number of units per pluggable modulator may differ from four.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for signal reconstruction, the method comprises:
    obtaining, an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and
    generating a hybrid estimation, wherein the hybrid estimation represents a magnitude of the transmitted optical signal and a phase of the received optical signal.

2. The method according to claim 1 wherein the generating of the hybrid estimation is executed without a-priory knowledge of a value of the transmitted optical signal.

3. The method according to claim 1 wherein the generating of the hybrid estimation comprises utilizing a radial representation of a constellation indicative of predefined known values of the transmitted optical signal.

4. The method according to claim 3 wherein the utilizing of the radial representation comprises selecting a selected radius value out of at least one radius values; wherein each radius of the at least one radius values represents a group of constellation symbols that share a same radius.

5. The method according to claim 4 wherein the at least one radius values are multiple radius values.

6. The method according to claim 1 wherein the generating of the hybrid estimation maintains phase information of the received optical signal.

7. The method according to claim 1 wherein the generating of the hybrid estimation is executed without estimating the phase difference between the transmitted optical signal and the received optical signal.

8. The method according to claim 1 wherein the generating of the hybrid estimation comprises generating, by an equalizer, an initial estimation of the transmitted optical signal; and processing the initial estimation by a phase maintaining amplitude slicer to provide the hybrid estimation.

9. The method according to claim 8 wherein the initial estimation of the transmitted optical signal has a value that is located within an annular region that covers a radial range that comprises a certain radius, the certain radius is shared by members of a group of constellation symbols.

10. The method according to claim 1 comprising processing the hybrid estimation.

11. The method according to claim 10 wherein the processing comprises generating a channel estimate of the channel.

12. The method according to claim 10 wherein the processing comprises performing a timing detection process.

13. The method according to claim 12 wherein the timing detection process is a Mueller and Muller timing detection process.

14. The method according to claim 10 wherein the processing comprises estimating the phase difference between the transmitted optical signal and the received optical signal.

15. The method according to claim 10 wherein the processing comprises at least one of equalizer coefficient calculation and equalizer tracker.

16. A device having signal reconstruction capability, the device comprises units that are configured to:
    obtain an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and
    generate a hybrid estimation, wherein the hybrid estimation represents a magnitude of the transmitted optical signal and a phase of the received optical signal.

17. The device according to claim 16 wherein the receiver is configured to generate the hybrid estimation without a-priory knowledge of a value of the transmitted optical signal.

18. The device according to claim 16 wherein the units are configured to generate the hybrid estimation by utilizing a radial representation of a constellation indicative of predefined known values of the transmitted optical signal.

19. The device according to claim 18 wherein the units are configured to utilize the radial representation of the constellation by selecting a selected radius value out of at least one radius values; wherein each radius of the at least one radius values represents a group of constellation symbols that share a same radius.

20. The device according to claim 19 wherein the at least one radius values are multiple radius values.

21. The device according to claim 16 wherein the units are configured to generate the hybrid estimation while maintaining phase information of the received optical signal.

22. A non-transitory computer readable medium for signal reconstruction, the non-transitory computer readable medium stores instructions for:
    obtaining, an input digital signal that is a digital representation of a received optical signal, wherein the received optical signal represents a transmitted optical signal that was transmitted by a coherent transmitter and over a channel to a coherent optical receiver; wherein a phase difference between the transmitted optical signal and the received optical signal is unknown; and
    generating a hybrid estimation, wherein the hybrid estimation represents a magnitude of the transmitted optical signal and a phase of the received optical signal.

* * * * *